(12) United States Patent
Meyers

(10) Patent No.: US 10,017,926 B2
(45) Date of Patent: *Jul. 10, 2018

(54) DEBRIS TRAP FOR A DRAIN

(71) Applicant: Lawrence G. Meyers, Layton, UT (US)

(72) Inventor: Lawrence G. Meyers, Layton, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/361,863

(22) Filed: Nov. 28, 2016

(65) Prior Publication Data

US 2017/0073950 A1  Mar. 16, 2017

Related U.S. Application Data

(63) Continuation of application No. 14/834,626, filed on Aug. 25, 2015, which is a continuation of application No. 12/862,689, filed on Aug. 24, 2010, now Pat. No. 9,139,989.

(51) Int. Cl.
| | |
|---|---|
| *E03C 1/26* | (2006.01) |
| *E03C 1/264* | (2006.01) |
| *E03F 5/04* | (2006.01) |
| *B01D 35/02* | (2006.01) |
| *B01D 35/28* | (2006.01) |
| *E03F 5/06* | (2006.01) |

(52) U.S. Cl.
CPC .............. *E03C 1/264* (2013.01); *B01D 35/02* (2013.01); *B01D 35/28* (2013.01); *E03C 1/26* (2013.01); *E03F 5/041* (2013.01); *E03F 5/0408* (2013.01); *E03F 5/06* (2013.01); *Y10T 29/49815* (2015.01)

(58) Field of Classification Search
USPC .................... 4/286, 289, 288, 292, 504, 490
See application file for complete search history.

(56) References Cited

U.S. PATENT DOCUMENTS

| | | | |
|---|---|---|---|
| 855,017 | A | 5/1907 | O'Brien |
| 889,051 | A | 5/1908 | Schodde |
| 1,127,246 | A | 2/1915 | Hirshstein |
| 1,143,174 | A | 6/1915 | Comstock |
| 1,189,742 | A | 7/1916 | Sanders |
| 1,469,303 | A | 10/1923 | Hess |
| 1,669,586 | A | 5/1928 | Boosey |
| 1,749,878 | A | 3/1930 | Fleming |
| 1,792,345 | A | 2/1931 | Williams |
| 1,830,065 | A | 11/1931 | Luff |
| 2,095,024 | A | 10/1937 | Boosey |

(Continued)

OTHER PUBLICATIONS

International Search Report for PCT/US2008/056731 dated Jul. 17, 2008.

(Continued)

*Primary Examiner* — Lauren Crane
(74) *Attorney, Agent, or Firm* — Workman Nydegger

(57) ABSTRACT

A debris trap for a floor drain includes a rim defining an outer diameter, an inner diameter, and a radial center. A plurality of prongs are integrally formed with the rim and spaced along at least part of the inner diameter. At least some of the prongs are arranged to extend over an inlet of a drain body and have a proximal portion connected to the rim and extending radially inward from the rim, and a free distal portion that is only upwardly curved from the proximal portion toward the radial center of the rim.

16 Claims, 5 Drawing Sheets

(56) References Cited

U.S. PATENT DOCUMENTS

| | | | |
|---|---|---|---|
| 2,281,448 A | 4/1942 | Mathey | |
| 2,394,964 A | 2/1946 | Dick | |
| 2,484,240 A | 10/1949 | Morthland | |
| 2,550,402 A | 4/1951 | Boosey | |
| 2,777,532 A | 1/1957 | Sisk | |
| 2,783,852 A | 3/1957 | Sisk | |
| 2,843,209 A | 7/1958 | Degen | |
| 2,859,452 A | 11/1958 | Seewack | |
| 2,898,129 A | 8/1959 | Sisk | |
| 2,981,333 A | 4/1961 | Miller | |
| 3,037,631 A | 6/1962 | Drehmann | |
| 3,040,895 A | 6/1962 | Sisk | |
| 3,075,203 A | 1/1963 | Stafford | |
| 3,121,682 A | 2/1964 | Alberico | |
| 3,246,582 A | 4/1966 | Wade | |
| 3,268,920 A | 8/1966 | Beer | |
| 3,742,524 A | 7/1973 | Ballentine | |
| 3,959,831 A | 6/1976 | Hendricks | |
| 4,032,455 A * | 6/1977 | Kale | B01D 29/11 137/247.51 |
| 4,067,072 A | 1/1978 | Izzi | |
| 4,146,939 A | 4/1979 | Izzi | |
| 4,150,009 A | 4/1979 | Milenius | |
| 4,199,827 A | 4/1980 | Tuleja | |
| 4,307,476 A * | 12/1981 | Halstad | E03D 11/00 4/256.1 |
| 4,418,432 A | 12/1983 | Vidal | |
| RE31,561 E | 4/1984 | Thompson | |
| 4,505,814 A | 3/1985 | Marshall | |
| 4,555,818 A | 12/1985 | Harrington | |
| 4,739,524 A | 4/1988 | Burd | |
| 4,845,914 A | 7/1989 | Burd | |
| 4,910,811 A | 3/1990 | Izzi | |
| 5,003,642 A | 4/1991 | Robb | |
| 5,022,430 A | 6/1991 | Degooyer | |
| 5,117,862 A | 6/1992 | Molligan | |
| 5,130,016 A | 7/1992 | Gavin | |
| 5,137,314 A | 8/1992 | Gunter | |
| 5,216,767 A | 6/1993 | Elmore | |
| 5,293,724 A | 3/1994 | Cornwall | |
| 5,299,836 A | 4/1994 | Woods | |
| 5,372,715 A | 12/1994 | Maggard | |
| 5,511,904 A | 4/1996 | Van Egmond | |
| 5,656,176 A | 8/1997 | Scott | |
| D421,295 S | 2/2000 | Barnett | |
| 6,088,842 A | 7/2000 | Barnett | |
| 6,173,455 B1 | 1/2001 | Nordstrom | |
| 6,175,971 B1 | 1/2001 | O'Neil | |
| 6,192,532 B1 | 2/2001 | Sesser | |
| 6,381,775 B1 | 5/2002 | Sondrup | |
| 6,553,583 B1 | 4/2003 | Pan | |
| 6,877,471 B1 | 4/2005 | Tanabe | |
| 6,890,427 B2 | 5/2005 | Self | |
| 7,178,179 B2 | 2/2007 | Barnes | |
| 7,178,675 B2 | 2/2007 | Votel | |
| 7,442,296 B2 | 10/2008 | Chong | |
| 7,472,719 B2 | 1/2009 | Dallmer | |
| 7,632,401 B2 | 12/2009 | Edelmayer | |
| 7,699,981 B2 | 4/2010 | Ledford | |
| 7,725,960 B2 | 6/2010 | Markaj | |
| 8,043,497 B2 | 10/2011 | Silverstein | |
| 8,146,616 B2 | 4/2012 | Dallmer | |
| 2003/0159978 A1 | 8/2003 | Self | |
| 2005/0223481 A1 | 10/2005 | Giacomi | |
| 2007/0000038 A1 | 1/2007 | Jordon | |
| 2007/0209109 A1 | 9/2007 | Meyers | |
| 2008/0005835 A1 | 1/2008 | Shipley | |
| 2008/0216221 A1 | 9/2008 | Markaj | |
| 2008/0271232 A1 | 11/2008 | Self | |
| 2008/0277324 A1 | 11/2008 | Meyers | |
| 2010/0043136 A1 | 2/2010 | Michael | |
| 2010/0235982 A1 | 9/2010 | Stimpson | |
| 2010/0288685 A1 | 11/2010 | Meyers | |
| 2010/0320130 A1 | 12/2010 | Meyers | |
| 2012/0047643 A1 | 3/2012 | Meyers | |

OTHER PUBLICATIONS

U.S. Appl. No. 12/046,352, Apr. 6, 2009, Office Action.
U.S. Appl. No. 11/716,851, Apr. 7, 2009, Office Action.
U.S. Appl. No. 11/716,851, Oct. 27, 2009, Final Office Action.
U.S. Appl. No. 12/046,352, Nov. 2, 2009, Final Office Action.
U.S. Appl. No. 12/862,681, Dec. 6, 2012, Office Action.
U.S. Appl. No. 12/862,689, Jan. 15, 2013, Office Action.
U.S. Appl. No. 12/772,220, May 28, 2013, Office Action.
U.S. Appl. No. 12/862,681, Jul. 23, 2013, Office Action.
U.S. Appl. No. 12/862,689, Aug. 14, 2013, Final Office Action.
U.S. Appl. No. 12/862,681, Sep. 18, 2013, Final Office Action.
U.S. Appl. No. 12/772,220, Nov. 27, 2013, Final Office Action.
U.S. Appl. No. 12/862,689, Dec. 4, 2013, Office Action.
U.S. Appl. No. 12/862,689, Jul. 29, 2014, Final Office Action.
U.S. Appl. No. 12/772,220, Nov. 10, 2014, Notice of Allowance.
U.S. Appl. No. 12/862,689, Dec. 16, 2014, Office Action.
U.S. Appl. No. 12/862,689, May 19, 2015, Final Office Action.
U.S. Appl. No. 12/862,689, Jun. 24, 2015, Notice of Allowance.
U.S. Appl. No. 12/772,220, Jul. 17, 2015, Notice of Allowance.

* cited by examiner

DEBRIS TRAP FOR A DRAIN

CROSS-REFERENCE TO RELATED APPLICATIONS

This application is a continuation of, and claims the benefit of, and priority to, U.S. patent application Ser. No. 14/834,626, filed Aug. 25, 2015, and entitled "DEBRIS TRAP FOR A TRAIN," which is a continuation of U.S. patent application Ser. No. 12/862,689, filed on Aug. 24, 2010, now U.S. Pat. No. 9,139,989, and entitled "DEBRIS TRAP FOR A DRAIN," the disclosure of each which is hereby incorporated herein in its entirety by this reference.

BACKGROUND

Field of the Invention

The present disclosure relates generally to drains, such as for tiled showers and the like. More particularly, the present disclosure relates to a removable debris trap for a drain.

Related Art

There are a variety of styles and types of floor drains for showers and the like. Both round and square or rectangular drains are available, and there are a variety of mechanisms for connecting drain structures with associated drainage pipes. There are also a variety of materials and finishes that have been used for drains and drain grates. For many years, floor drains and grates have been made of non-corrosive metals, such as brass and stainless steel. More recently, because of their low cost and ease of use, polymer materials have been used for drain structures and drain grates, often in combination with metal structures. For example, drains comprising a polymer drain body and a metal drain grate are quite common. Drain grates comprising a polymer structure with a sheet metal cladding are also available.

One challenge with floor drains and other drains is the potential for clogs of hair and other debris. To prevent clogs of hair and other debris, hair traps and debris traps have been developed for drains. There are a variety of designs and configurations for hair and debris traps. However, with many of these, removal can be difficult and time-consuming, and cleaning can be a difficult and disgusting task. Additionally, some hair trap devices present an aesthetically undesirable appearance in or near a drain.

SUMMARY

It has been recognized that it would be advantageous to develop a debris trap for a drain that is effective at trapping hair and the like.

It has also been recognized that it would be advantageous to develop a debris trap for a drain that is easy to remove, clean, and replace.

In accordance with one embodiment thereof, the present invention provides a debris trap for a drain. The debris trap includes an annular rim, defining a center, with a plurality of radial prongs, extending from the rim toward the center, and oriented to catch debris in the drainage pathway. The debris trap is removably disposable within a drainage pathway of a drain body, below a removable drain grate of the drain.

In accordance with another aspect thereof, the invention provides a drain system, including a drain body and a debris trap. The drain body includes a circular lower portion defining an outlet, which is configured to mate with an underdrain structure, and an upper portion defining an inlet, configured to receive a drain grate in a frictional fit. The drain body also includes a circular recess below the upper portion and concentric with the outlet, having a diameter larger than an inner diameter of the outlet. The debris trap is configured to be disposed in the circular recess, and includes an annular rim defining a center, and a plurality of radial prongs extending from the rim toward the center, oriented to catch debris in the drainage pathway.

In accordance with yet another aspect thereof, the invention provides a method for removing debris from a drain. The method includes the steps of removing a drain grate from a drain body of the drain, removing a debris trap from a resting position within a drainage pathway of the drain body and below a level of the drain grate, removing debris from the debris trap, replacing the debris trap within the drain body, and replacing the grate. The debris trap includes an annular rim defining a center and a plurality of radial prongs extending from the rim to a free distal end a distance from the center, and removing debris from the debris trap comprises removing debris from the prongs.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
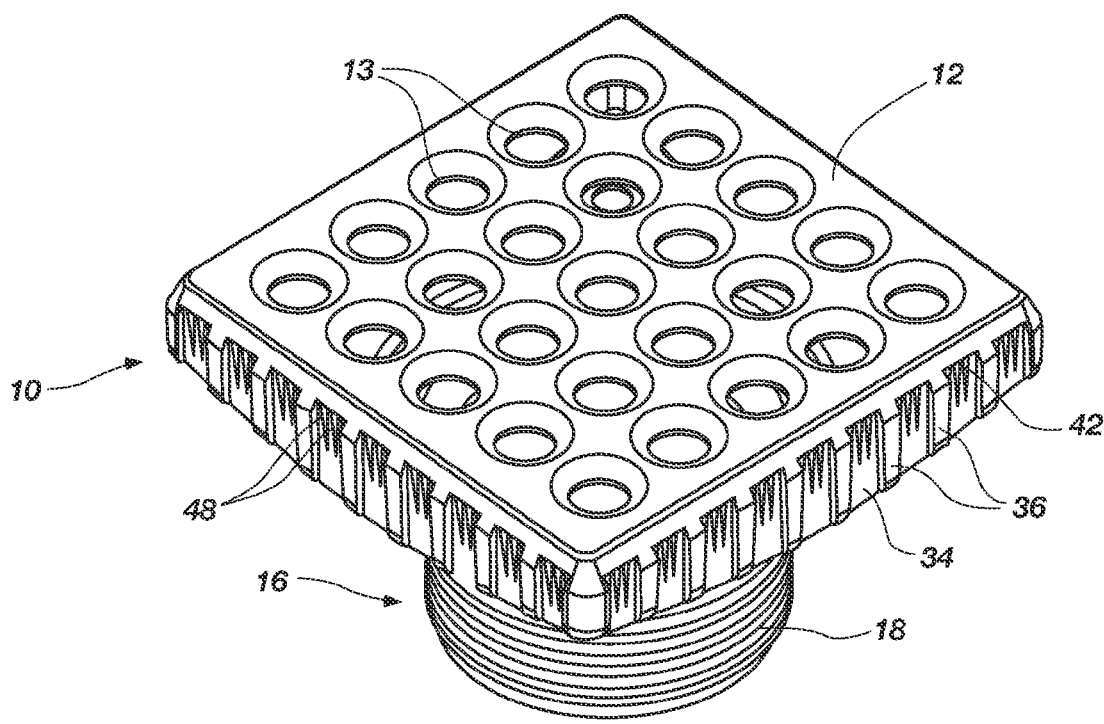
FIG. 1 is a perspective view of one embodiment of a floor drain body with a drain grate in place.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
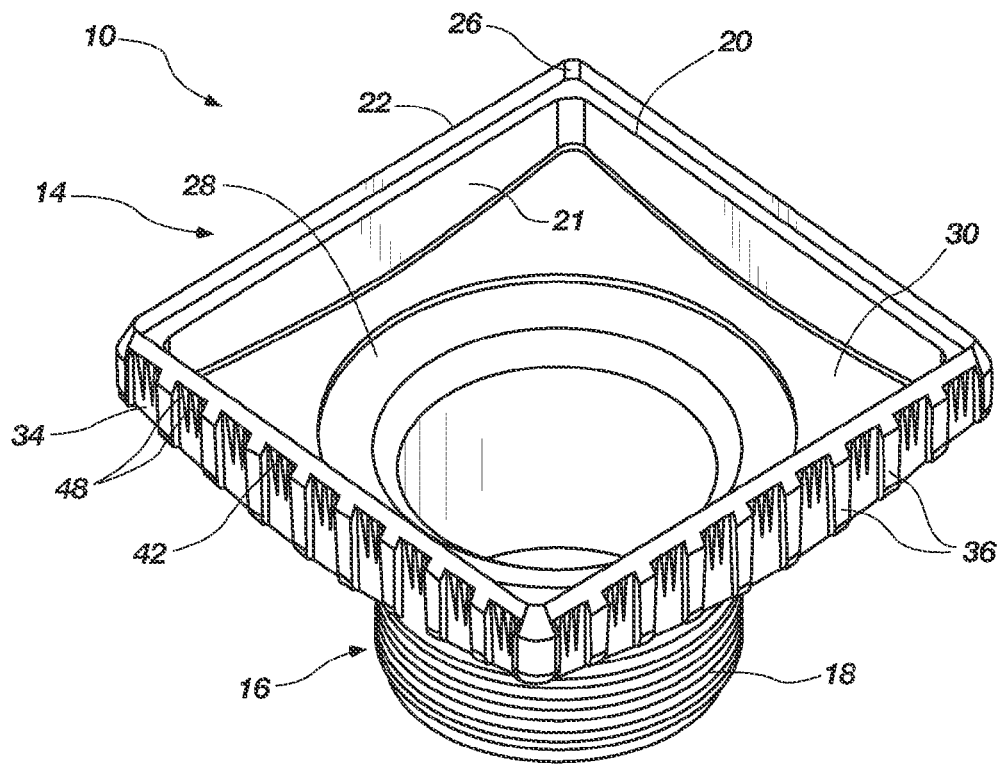
FIG. 2 is a perspective view of the drain grate of FIG. 1 with the grate removed, showing a central recess above the outlet within the drain body.

Shown in FIG. 1 is a drain body or riser 10 with a grate 12 having drain openings 13. The drain body is shown with the grate removed in FIG. 2. This drain body 10 is a one-piece unit, having a generally rectangular upper portion 14 defining an inlet, and a circular lower portion 16 defining an outlet and being configured to mate with an underdrain structure. It is to be understood that, while the drain body shown in FIGS. 1 and 2 has a rectangular inlet, drain bodies having inlets of other shapes, such as circular, can also be used. The lower portion of the drain body includes external helical threads 18 for connection to the underdrain, allowing the height of the drain inlet to be adjusted by rotating the drain body. The drain body can be of an injection-molded polymer, such as ABS (Acrylonitrile Butadiene Styrene) plastic, allowing it to be strong and lightweight.

The inlet portion 14 of the drain body 10 includes a shoulder 20 on its inner perimeter, for supporting the drain grate 12. Surrounding the shoulder is a grout rim 22 that is integral with the drain body. The grate 12 is supported only around it's perimeter by a narrow shelf (i.e. shoulder 20) in the drain body 10. Just inside and below that shelf is a near-vertical surface 21 that extends down to the floor of the bowl 30. Against this surface an inner perimeter rib or wall of the grate frame can make a light friction fit. The inner surface of the grout rim includes 90 degree filleted corners 26. This configuration helps reduce binding of the grate and allows for a wide selection of grate opening configurations. The drain body can also include a step or recess 28 in the bowl floor 30, which can allow for the inclusion of a debris trap device 50 (shown in FIG. 3).

By design, the bowl 30 of the drain body 10 is relatively deep (compared to the size of the grate openings 13). This helps create a shadow and a blacked-out effect that is very desirable, especially where the drain body is black or some other dark color. When viewed from the top through the openings 13 in the grate 12, the visibility of any build-up of soap scum, scale and hair will be substantially reduced. The grate looks clean and beautiful and is not detracted by a view of scum build up just below the surface.

The grout rim 22 provides a sharp termination at the top edge of the drain body 10, and becomes substantially hidden to the eye when embedded into an adjacent grout line. When a drain grate 12 is inserted into the inlet portion 14 and supported by the shoulder 20, friction between the vertical surface 21 and a perimeter rib (not shown) of the drain grate's frame holds the grate in place. A small clearance can be maintained between the grate 12 and the grout rim 22 to allow for drainage immediately around the slightly elevated grate.

Around the outer sides 34 of the inlet portion 14 of this embodiment of the drain body 10 are undercut grout locking features that help anchor the drain body with surrounding mortar and grout material. The undercut grout locking features can include a horizontal undercut edge 42, and tapered or dovetail surfaces associated with vertical buttresses 36, to cause the buttresses to interlock with surrounding grout, allowing the grout to capture the drain body and hold it in position in a dovetail arrangement. The buttresses have a dovetail shape that becomes wider as the buttress extends away from the sidewall 34 of the drain body. This provides dovetail surfaces that are angled toward the drain body, so that a mechanical interlock is created with grout material that surrounds the drain body. Since the dovetail surfaces of the buttresses are angled with respect to a vertical plane, and the angled undercut surface of the undercut edge 42 is angled with respect to a horizontal plane, the undercut edge and the ovetail buttresses combine to anchor the drain body with respect to both vertical and horizontal movement.

The outer sides 34 of the drain body can also include vertical darts 48 below or along the horizontal undercut 42 to improve plastic flow to thin wall sections during the molding process, as well as to add rigidity. Given their angular faces, the darts also help provide additional anchorage of the drain body in the surrounding grout material, while their small size in relation to the buttresses does not weaken the anchoring grout material between the buttresses.

Since it is installed using only a light friction fit and no screws or other fasteners, the drain grate 12 can be easily removed, such as by using a T-handle grate removal tool (not shown), or other suitable tool. During installation of the drain body and construction of the surrounding floor structure, a solid flat plug can be installed in the drain body in place of the grate to prevent construction debris from falling into the drain, prevent damage to the grate, and to stabilize the knife edge rim 22 of the drain body and help maintain the shape of the inlet.

As noted above, hair clogs are a constant challenge with drains. There are a variety of types of hair and debris traps that have been used with floor drains and other drains. Unfortunately, many of these are difficult to retrieve and remove from a drain or pipe, and can present a smelly and disgusting task to remove hair and debris tangled around steel tines, etc.

Figure 3:
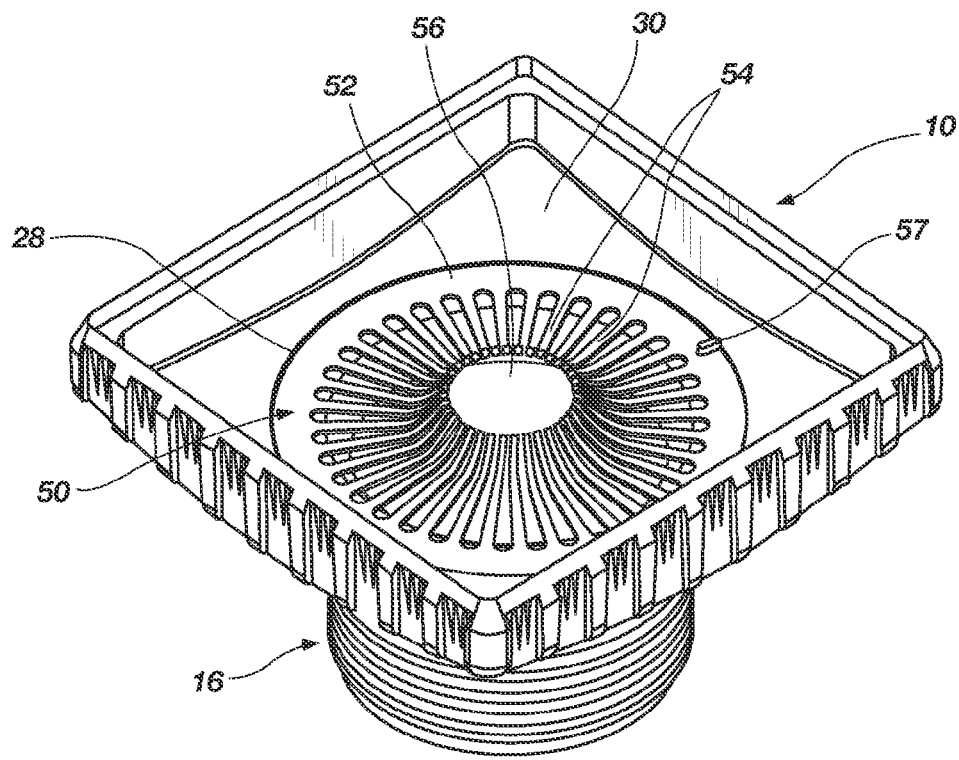
FIG. 3 is a perspective view like that of FIG. 2, showing one embodiment of a removable debris trap disposed in the recess within the drain body.
Figure 4:
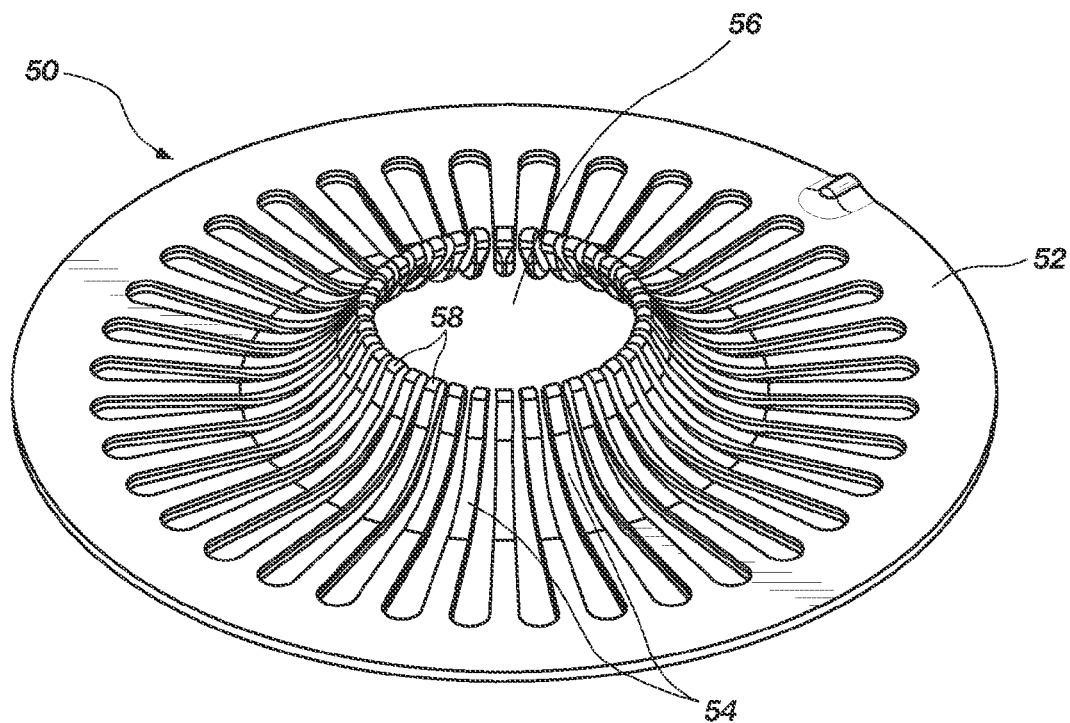
FIG. 4 is a perspective view of an embodiment of a debris trap in accordance with the present disclosure.
Figure 5:
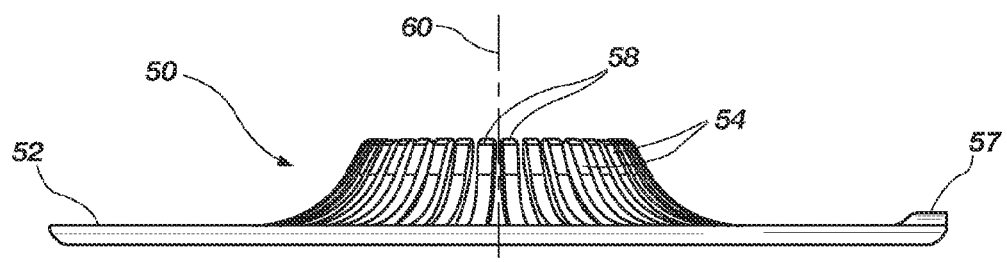
FIG. 5 is a side view of the debris trap of FIG. 4.
Figure 6:
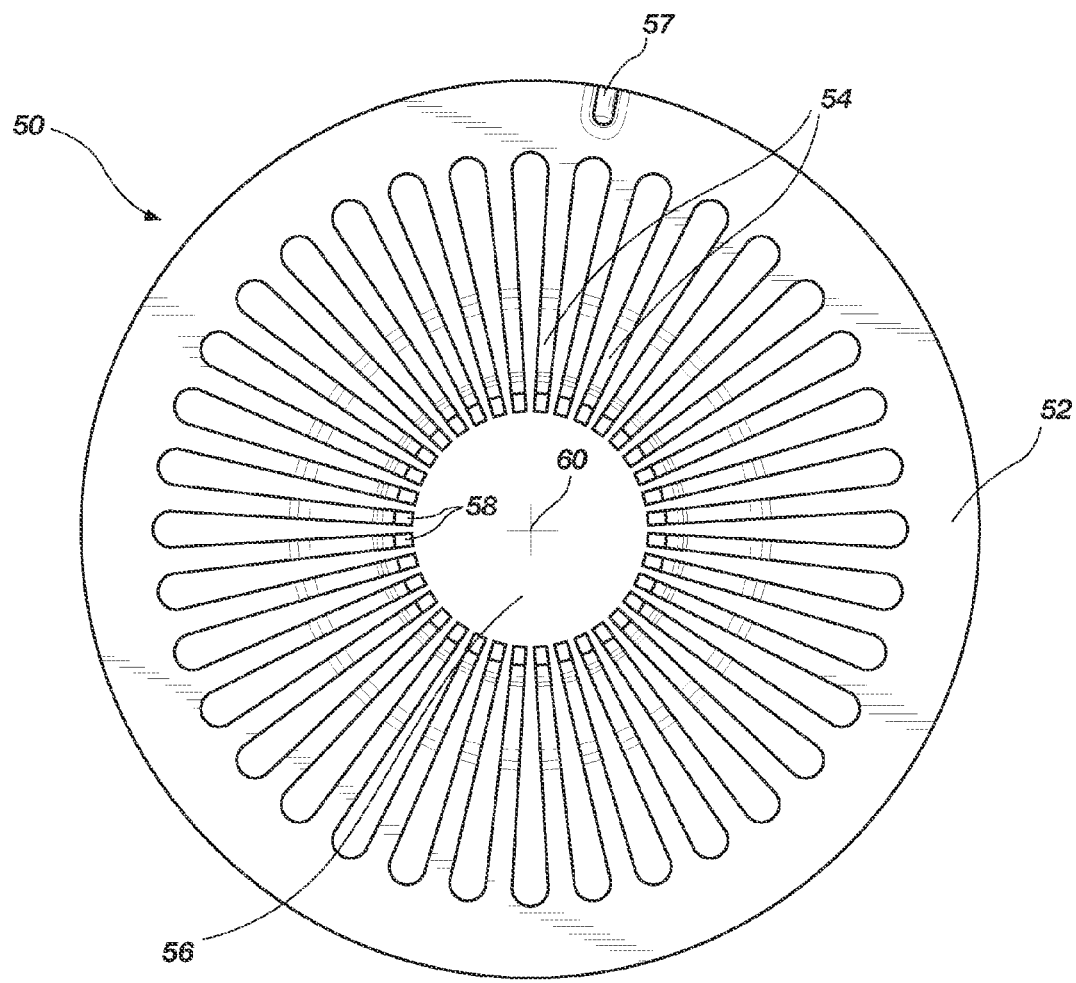
FIG. 6 is a top view of the debris trap of FIG. 4.

Advantageously, the inventor has developed a debris trap for a drain, various embodiments of which are shown in the figures. While the debris trap disclosed herein is shown in the context of a floor drain, it is to be understood that it can be used with a variety of types of drains, in addition to floor drains. As shown in FIG. 3 one embodiment of a circular debris trap device 50 can be placed in a shallow, circular recess 28 in the floor 30 of the bowl of the drain body 10. Viewing FIGS. 3-7, this debris trap embodiment 50 is a unitary piece of injection-molded plastic, and includes an annular outer ring or rim 52, with a series of integral radial spokes or prongs 54 that extend toward the center of the ring, but leave a clear opening 56 in the middle. The circular rim 52 can include a raised protuberance 57, disposed along an exterior edge of the rim. This protuberance helps ensure that the debris trap is placed in the drain right-side-up (i.e. with the curvature of the prongs 54 oriented upward). If the debris trap were to be placed into the recess 28 in the drain body upside down, the protuberance 57 would cause it to not lie flat and secure, thus signaling to a user to change the orientation.

The debris trap 50 with prongs 54 helps catch hair and other debris that drops through the drain grate 12, without significantly obstructing the flow of water through the drain body 10. Since hair and heavier debris will tend to drop through the outer openings of the drain grate 12, it will tend to be washed nearer the perimeter of the bowl of the drain body, and be caught by the prongs 54 of the debris trap 50. On the other hand, water that flows and drops straight through the center of the grate, and thus the center opening 56 of the debris trap, is believed to be less likely to include hair and other debris.

As noted above, in the drain embodiment shown in FIGS. 1 and 2, the drain grate 12 is designed to be removable just by pulling it out of the drain body 10, allmving a user periodically to lift the debris trap out of the drain body, remove the hair and clean the debris trap, then replace the debris trap and the grate. It is to be understood, however, that the debris trap disclosed herein can be used with drains having a different configuration than that shown in FIGS. 1 and 2. Cleaning the debris trap is simple and straightforward. Hair and debris can be slid toward the open center 56, where it slides off the prongs 54. This allows easy, unrestricted removal of debris from this debris trap.

The prongs 54 are resilient and springy, and curved upward. Each prong has an upwardly curved free end 58 near the center, indicated at 60. The number, spacing, and thickness of the prongs 54 can vary. In one embodiment, a debris trap having a diameter of 3" has been produced with 36 prongs spaced every 10 degrees, each prong being about 0.05" wide at the distal tip 58, and about 0.1" wide at the base (the junction with the rim 52). Different numbers and sizes of prongs can be used. The size of the center opening 56 can vary also. To provide good drainage, it is desirable that the center opening be larger than about 0.5" in diameter. In one embodiment, this opening is about 0.8" in diameter. With a 3" diameter debris trap and a 0.8" diameter center opening, each prong will be less than about 1" long, measured in the plan view. The upward curvature of the prongs can have a radius of about 0.4". It is to be appreciated that different curvature designs can be used, and the prongs can also be straight, with no curvature.

Figure 7:
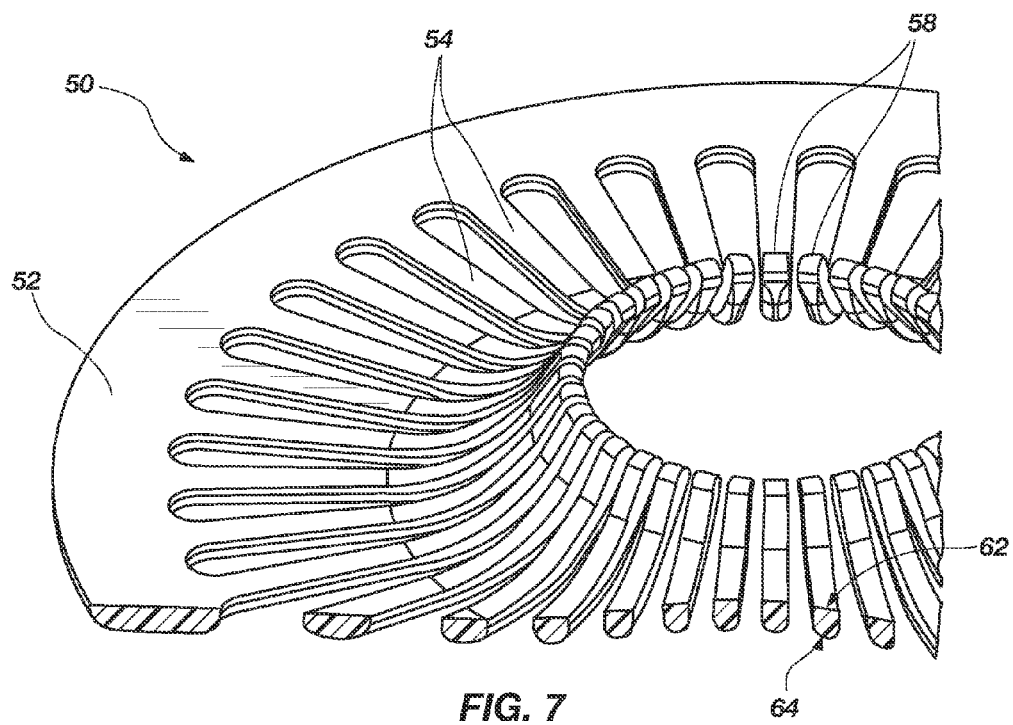
FIG. 7 is a close-up, perspective, partially sectional view of the debris trap of FIG. 4.

The cross-sectional shape of the prongs 54 can also vary. FIG. 7 provides a partial sectional view of the debris trap 50 taken through some of the prongs 54, showing one embodiment of a cross-sectional shape that can be used. In this embodiment, the prongs have a substantially flat top surface 62, which encourages hair strands to bridge between tines rather than to pass through or between them, and a rounded or curved bottom surface 64, which is believed to help to accelerate water flow.

Figure 8:
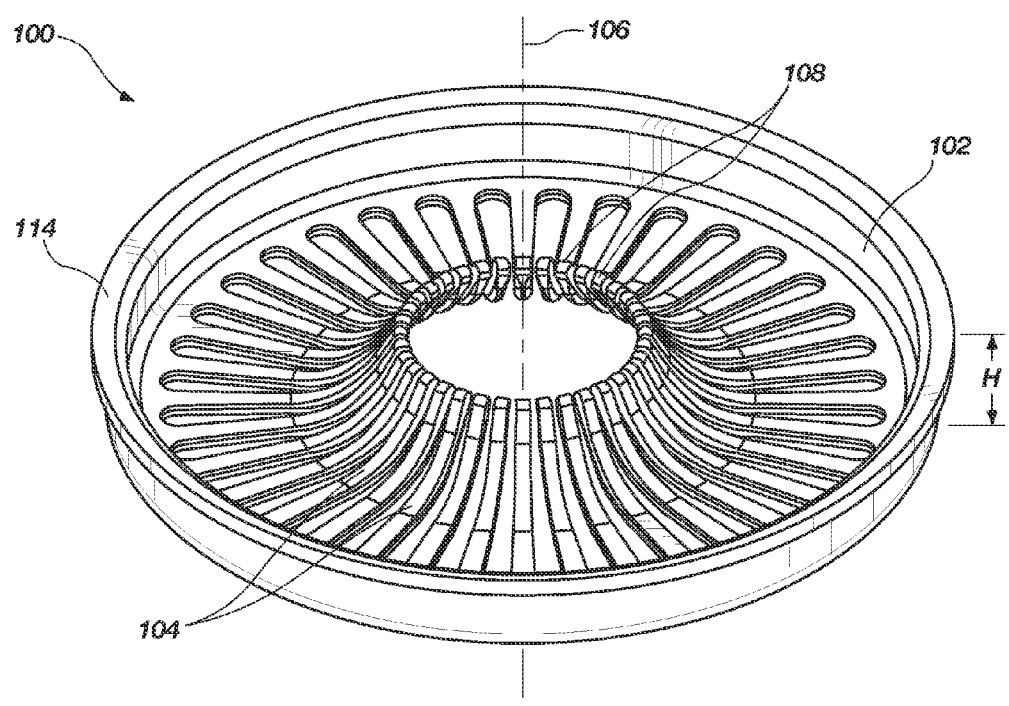
FIG. 8 is a perspective view of another embodiment of a debris trap in accordance with the present disclosure.
Figure 9:
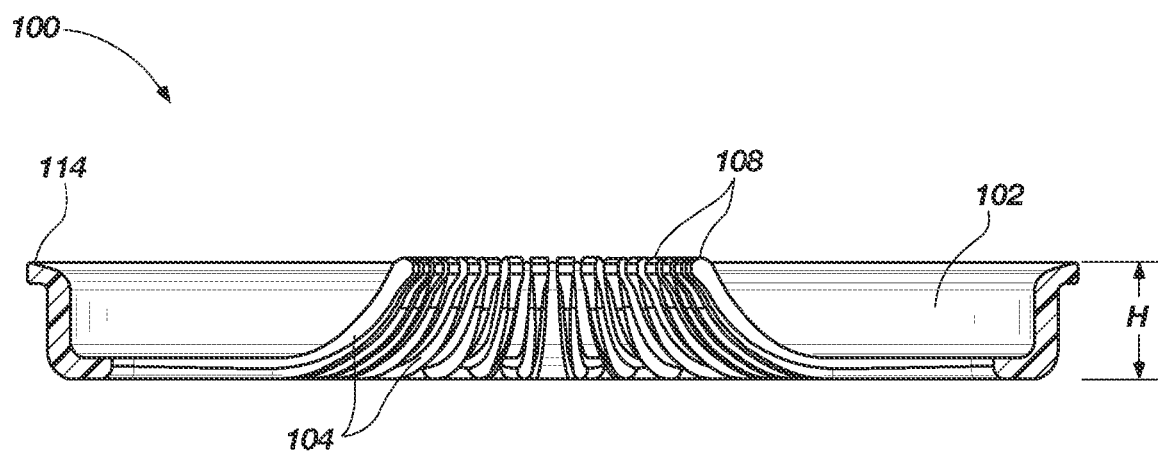
FIG. 9 is a side, cross-sectional view of the debris trap of FIG. 8.
Figure 10:
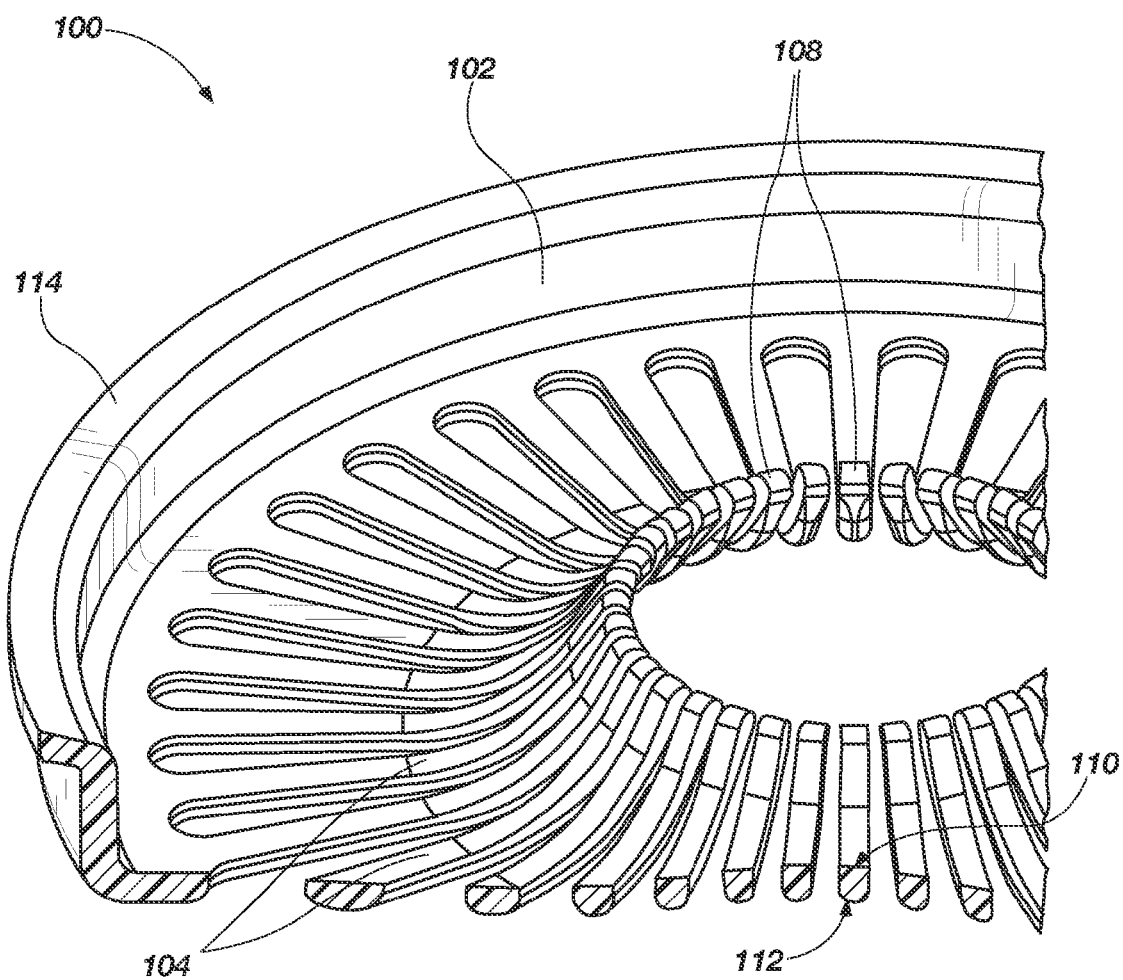
FIG. 10 is a close-up, perspective, partially sectional view of the debris trap of FIG. 8.

Another embodiment of a debris trap in accordance with the present disclosure is shown in FIGS. 8-10. In this embodiment, the debris trap 100 comprises a cylindrical ring 102, having a plurality of radial tines or prongs 104 extending toward its center, indicated at 106. The prongs 104 are flexible and resilient, and curve upward toward their free ends 108 near the center. These prongs are substantially like the prongs 54 described above, and include a flat top surface 110, a rounded bottom surface 112, and an upwardly curved distal end 108.

In this embodiment, the perimeter ring 102 of the debris trap 100 has a significantly greater vertical dimension H, and is configured to slide or snap into a corresponding cylindrical recess in a drain body (not shown). Alternatively, the debris trap 100 can be configured to fit into an opening of a circular conduit. The ring 102 provides an upwardly oriented, cylindrical flange, which press-fits into a circular recess within the drain body. This makes the debris trap more secure and stable in its installed position. The ring 102 includes a top flange 114 that helps hold the debris trap in place, and gives the debris trap a minimum diameter that is larger than the diameter of the drainage opening or conduit beyond, thus ensuring that it cannot be lost down the drain.

In the embodiment of FIGS. 3-7, the size, shape and placement of the debris trap 50 ensure that it cannot be lost down the drain and contribute to its aesthetic appeal. The debris trap sits within the circular recess 28 above the outlet of the drain body 10. It has been found that gravity alone is sufficient to keep this embodiment of the debris trap securely in place. The diameter of the debris trap 50 is larger than the diameter of the interior of the outlet 16 of the drain body 10, thus preventing the debris trap from being washed down the drain in any orientation. Also, because the debris trap 50 is designed to fit into a recessed pocket 28 within the drain body and below the drain grate 12, it is substantially out of sight, thus contributing to the aesthetics of the drain installation.

This disclosure thus provides a simple debris trap device that is effective at trapping hair and debris in a drain, and is easy to retrieve and remove from the drain. Cleaning of the debris trap is also simple and easy. This debris trap can be injection molded as a single unitary piece, making it very economical. Indeed, the simplicity and low cost makes disposability of this type of debris trap an option. That is, rather than removing, cleaning and replacing the device periodically, a user can remove and discard the debris trap device and replace it with a new one whenever desired.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A debris trap for a floor drain having a drain body defining an inlet, an outlet and a recess concentric with the outlet, and a grate positionable on the drain body over the inlet, the debris trap comprising:
   a rim defining an outer diameter, an inner diameter, and a radial center, the rim having an annular disk shape arranged to fit in the recess below the grate; and
   a plurality of prongs integrally formed with the rim and spaced along at least part of the inner diameter, at least some of the prongs arranged to extend over the outlet of the drain body and having a proximal portion starting at the rim and extending radially inward from the rim, and a distal portion that curves upwardly toward a free end of the distal portion near the radial center.

2. The debris trap of claim 1, wherein a width of the proximal portion is greater than a width of the distal portion.

3. The debris trap of claim 1, wherein a distance between adjacent ones of the prongs is greater toward the proximal portions than the distal portions.

4. The debris trap of claim 1, wherein the free ends of the prongs at least in part define a center opening.

5. The debris trap of claim 4, wherein the free ends of the prongs extend above the rim.

6. The debris trap of claim 1, wherein at least some of the prongs are flexible and resilient.

7. The debris trap of claim 1, wherein at least some of the prongs define a substantially flat top surface.

8. The debris trap of claim 1, wherein the prongs define spaces therebetween.

9. The debris trap of claim 8, wherein each space defines a curved proximal end and an open distal end.

10. The debris trap of claim 1, wherein a ring portion is integral to the rim.

11. The debris trap of claim 10, wherein a top of the ring portion defines a radial flange.

12. The debris trap of claim 1, wherein the rim and the prongs comprise a single unitary piece.

13. The debris trap of claim 1, wherein a top surface of the prongs defines a concave curvature.

14. A floor drain system comprising:
   a floor drain having a drain body defining an inlet, an outlet, and a circular recess surrounding the outlet;
   a grate positionable on the drain body over the outlet; and
   a debris trap positionable in the circular recess below the grate, the debris trap having:
      a rim defining an outer diameter, an inner diameter, and a radial center, the rim having an annular disk shape arranged to fit in the recess; and
      a plurality of prongs spaced along at least part of the inner diameter and extending radially inward toward the radial center, each prong arranged to extend over and across at least a portion of the outlet and having a proximal portion starting at the rim and extending radially inward from the rim, and a distal portion that curves upwardly toward a free end of the distal portion near the radial center.

15. The system of claim 14, wherein the prongs are integral to the rim.

16. The system of claim 14, wherein the distal portions of the prongs include distal ends at least in part defining a center opening.

\* \* \* \* \*